United States Patent [19]

Denton et al.

[11] 4,175,756

[45] Nov. 27, 1979

[54] COMBINATION THRUST WASHER AND SEAL ARTICLE, APPARATUS

[75] Inventors: Dennis N. Denton, Gaston County; Martin E. Benjamin, Gastonia, both of N.C.

[73] Assignee: Garlock Inc., Longview, Tex.

[21] Appl. No.: 768,070

[22] Filed: Feb. 14, 1977

[51] Int. Cl.² .............................................. F16J 15/10
[52] U.S. Cl. .................... 277/189; 308/36.1
[58] Field of Search ............ 277/189, 212 F; 308/187.1, 187.2, 36.1

[56] References Cited

U.S. PATENT DOCUMENTS

| | | | |
|---|---|---|---|
| 2,878,084 | 3/1959 | Bermingham | 277/95 |
| 3,199,879 | 8/1965 | Fleming | 277/212 F |
| 3,554,560 | 1/1971 | Miyake | 277/92 |
| 3,700,296 | 10/1972 | Bugmann | 277/95 |
| 3,844,631 | 10/1974 | Otto | 308/187.1 |
| 3,845,961 | 11/1974 | Byrd | 277/212 F |
| 3,973,782 | 8/1976 | Evans | 277/212 F |

*Primary Examiner*—Robert I. Smith
*Attorney, Agent, or Firm*—Schovee & Boston

[57] ABSTRACT

A thrust washer is combined with a seal for preventing contaminants from entering into the assembly and doing corrosion damage. In one embodiment, a spring shackle bracket assembly thrust washer is provided with an elastomeric seal bonded thereto and having a sealing lip extending from the I.D. of the washer axially into the space between the spring eye and the shackle pin. In addition, a layer of the seal material on a radial face of the washer can prevent wear between the washer and the adjacent bracket.

32 Claims, 3 Drawing Figures

COMBINATION THRUST WASHER AND SEAL ARTICLE, APPARATUS

BACKGROUND OF THE INVENTION

1. Field of the Invention

This invention relates to thrust washers such as are used in spring shackle bracket assemblies as on trucks and other vehicles.

2. Description of the Prior Art

Thrust washers used in prior practice served only as thrust devices and were not able to prevent contaminants such as salt, water, chemicals, etc., from entering the assembly and causing corrosion damage in and around mating components.

It is an object of the present invention to provide a new combination thrust washer and seal article, apparatus and method for preventing contaminants from entering into such an assembly and to thus prevent corrosion damage and also to prevent wear between a thrust washer and the adjacent bracket.

It is another object of this invention to extend the life of the assembly, to provide a definite cost savings in repairs, and to reduce the extended service time of the prior art due to the difficulty in removing worn bushings in spring shackle bracket assemblies.

SUMMARY OF THE INVENTION

A combination thrust washer and seal for use, for example, in a spring shackle bracket assembly and comprising an annular ring-shaped metal thrust washer and an annular seal material covering or at least partially covering the washer and having a sealing lip for preventing corrosion action on mating components by sealing out unwanted contaminants. In one embodiment, the seal material is an elastomeric material bonded to the washer and having a wear resistant layer substantially covering at least one radial face of the washer and including a seal body having an anchor portion and an axially extending sealing lip having a proximal end adjacent the I.D. of the washer and extending axially away from the washer on the opposite side from said layer and having a radially enlarged distal end for sealing the space between the I.D. of the spring eye and the O.D. of the shackle pin. The wear resistant layer can prevent wear between a steel thrust washer rubbing against an aluminum bracket.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE PREFERRED EMBODIMENTS

Figure 1:
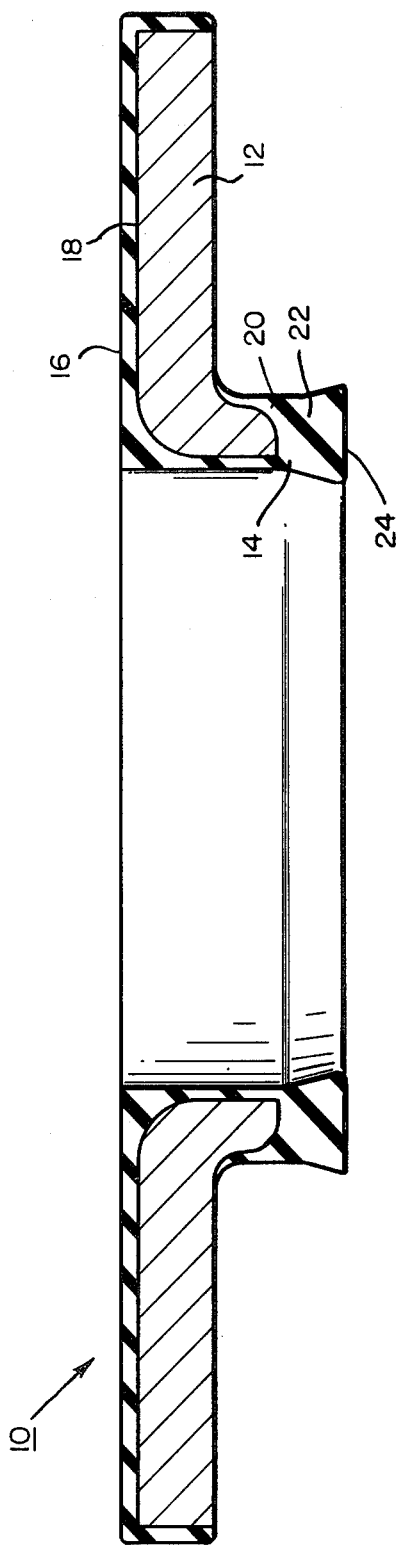
FIG. 1 is a cross-sectional view through one combination thrust washer and seal according to the present invention.

With reference now to the drawings, FIG. 1 shows a preferred combination thrust washer and seal 10 according to the present invention comprising an annular ring-shaped thrust washer 12 and an annular elastomeric seal body 14 bonded to the thrust washer 12. The elastomeric material preferably also includes a wear-resistant layer 16 substantially covering an outer (meaning axially outwardly away from the application) radial face 18 of the thrust washer. The seal body 14 includes an anchor portion 20 bonded to the washer and an axially extending sealing lip 22 having a proximal end adjacent the I.D. of the washer 12 and extending axially away from the washer and having a distal sealing end 24. In this embodiment the distal end 24 is enlarged both radially inwardly and radially outwardly from the remainder of the sealing lip 22. The distal end 24 has an I.D. smaller than the I.D. of the thrust washer and has a normal or uncompressed radial thickness that is greater than the radial distance of the space to be sealed (such as the space 26 in FIG. 2).

Figure 2:
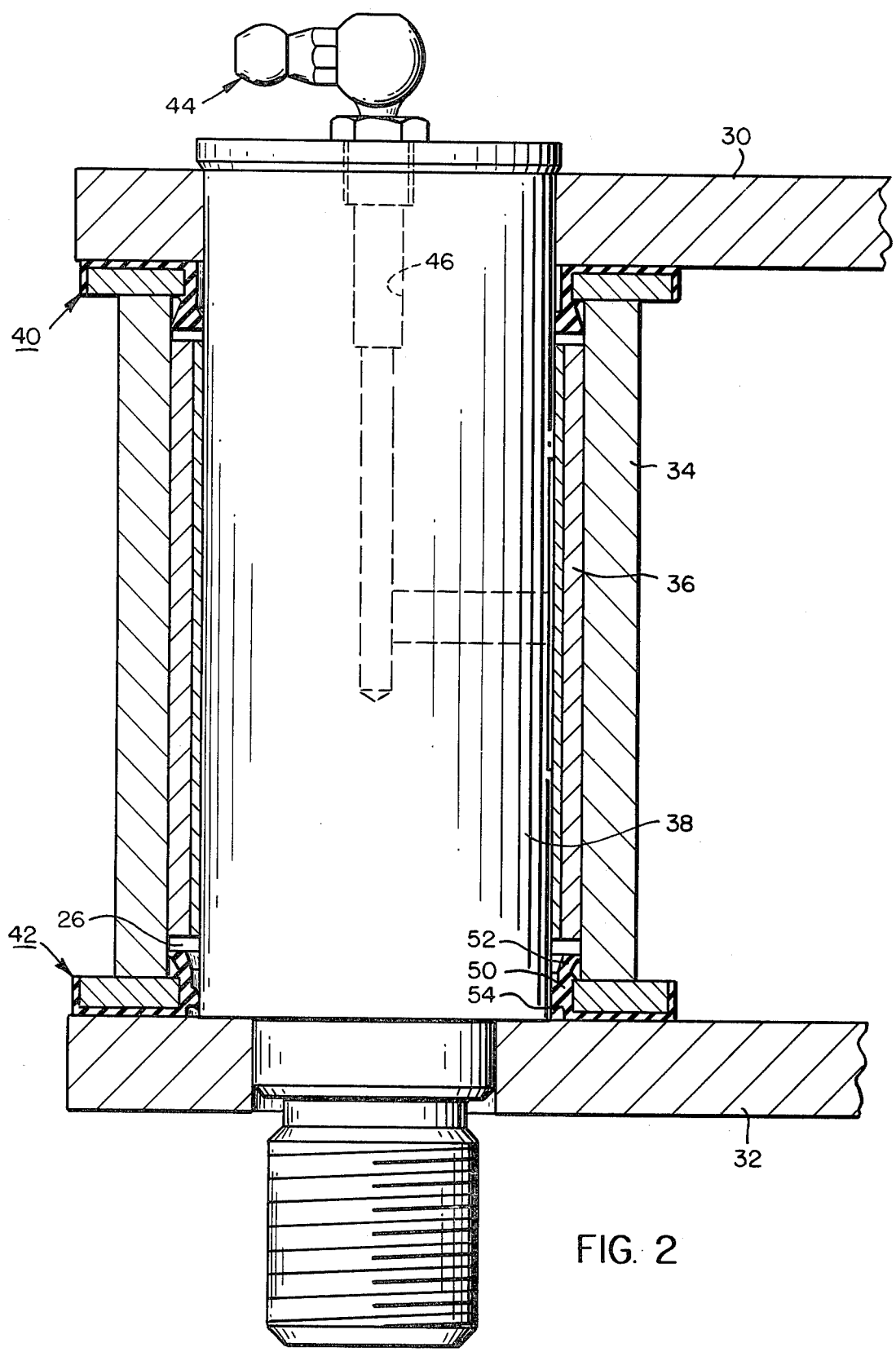
FIG. 2 is a partial cross-sectional view through a truck shackle bracket assembly showing two additional combination thrust washer and seal embodiments of the present invention.

FIG. 2 shows a spring shackle bracket assembly including a pair of brackets 30 and 32, a leaf spring eye 34, a bushing 36 pressed into the spring eye 34, a shackle pin 38 and a pair of combination thrust washer and seal articles 40 and 42 according to additional and different embodiments of the present invention. Two different thrust washer and seal articles 40 and 42 are shown for purposes of illustration only. Normally in any particular installation using two combination thrust washer and seal articles of this invention, two of the same design would be used. In addition, FIG. 2 shows a grease fitting 44 and grease lines 46 for use with a purgeable combination thrust washer and seal 42 for use if the design is one in which grease is to be purged through the bushing. If the design is one in which grease is not to be purged through the bushing, then the grease fitting 44 and grease lines 46 would not be used and a combination thrust washer and seal would be used which is not grease purgeable, such as the thrust washer and seal 40.

Each of the combination thrust washer and seals 40 and 42 have the same basic features of the thrust washer and seal 10 of FIG. 1 of an annular, ring-shaped, metal thrust washer and an annular elastomeric seal body having an anchor portion and an axially extending sealing lip having a proximal end adjacent the I.D. of the washer and a distal end adapted to sealingly contact at least one of an I.D. and an O.D. cylindrical surface. In addition, the elastomeric material also includes a wear-resistant layer substantially covering the outer radial surface of the washer.

In the combination thrust washer and seal 40, the distal end of the sealing lip is identical to the distal end 24 of the sealing lip 22 in FIG. 1 and has an uncompressed radial thickness greater than the radial distance between the O.D. of the pin 38 and the I.D. of the spring eye 34; the distal end of the sealing lip is press-fitted into the space 26 to provide the seal.

The combination thrust washer and seal 42 is designed to be grease purgeable for use in applications in which grease is to be purged through the bushing. In this embodiment, a seal body 50 has a primary sealing lip 52 and an auxiliary, grease purgeable sealing lip 54.

Figure 3:
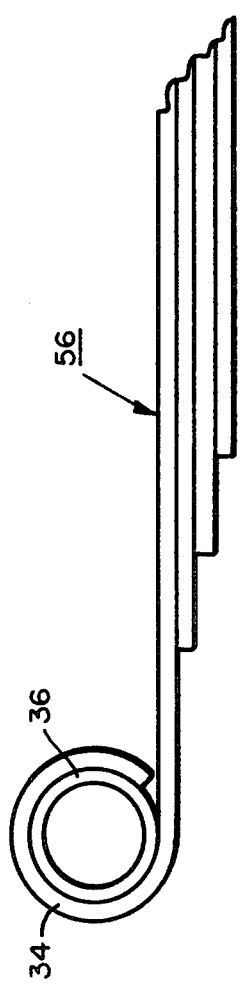
FIG. 3 is a partial cross-sectional view through a spring eye and bushing.

FIG. 3 is a side view of part of a truck leaf spring 56 showing the spring eye 34 and bushing 36 of FIG. 2 from a different direction to even more clearly show the arrangement of parts in FIG. 2.

This invention has been described in detail with particular reference to preferred embodiments thereof, but it will be understood that variations and modifications can be effected within the spirit and scope of the invention as described hereinabove and as defined in the appended claims. For example, the layer of elastomer covering the radial surface of the washer is preferably on the outside of each washer, (as shown in FIG. 2), for preventing wear between the steel thrust washer rubbing against the aluminum bracket, however, if this is not a concern then the rubber layer can be omitted or can appear on the opposite face of the thrust washer. Further, while the washer is preferably metal and the seal material is preferably an elastomer bonded to the metal washer, other materials and other means for attachment can be used. This invention is useful in other applications than spring shackle bracket assemblies, as will be understood by those skilled in the art.

What is claimed is:

1. An article comprising a combination thrust washer and seal, said thrust washer and seal including a thrust washer and an annular seal body connected to said thrust washer, said thrust washer comprising a flat, solid, rigid, metal ring and a layer of material of said seal body substantially covering at least one radial side of said ring, said thrust washer having a pair of flat, continuous radial surfaces that are perpendicular to the axis of the thrust washer and that are adapted to carry an axial load, at least one of said radial surfaces being adapted to accommodate rotary motion between itself and an associated machine member in contact therewith, said seal body including an anchor portion connected to said washer and an axially extending sealing lip having a proximal end adjacent the I.D. of said washer and extending axially away from said washer and having a distal end adapted to sealingly contact at least one of an I.D. and an O.D. cylindrical surface.

2. The article according to claim 1 wherein said ring has a thickness greater than that of said layer.

3. The article according to claim 2 wherein said at least one of said radial surfaces includes each of said radial surfaces.

4. The article according to claim 1 wherein said at least one radial face of said washer is on the opposite side thereof from said sealing lip.

5. The article according to claim 1 wherein said distal end has a radial thickness greater than that of the remainder of said sealing lip and includes an enlargement extending both radially inwardly and radially outwardly such that said distal end can contact both an I.D. and an O.D. cylindrical surface to provide a seal therebetween.

6. The article according to claim 1 wherein said washer includes a cylindrical portion inside of said anchor portion.

7. The article according to claim 1 wherein said seal body includes a radially extending auxiliary lip, spaced-apart from the distal end of said sealing lip, and extending radially inwardly from the I.D. of said washer.

8. The article according to claim 1 wherein said washer is metal and said seal body is an elastomer bonded to said washer.

9. The article according to claim 8 wherein said at least one radial face of said washer is on the opposite side thereof from said sealing lip.

10. The article according to claim 9 wherein said distal end has a radial thickness greater than that of the remainder of said sealing lip and includes an enlargement extending both radially inwardly and radially outwardly such that said distal end can contact both an I.D. and an O.D. cylindrical surface to provide a seal therebetween.

11. The article according to claim 10 wherein said washer includes a cylindrical portion inside of said anchor portion.

12. The article according to claim 11 wherein said seal body includes a radially extending auxiliary lip, spaced-apart from the distal end of said sealing lip, and extending radially inwardly from the I.D. of said washer.

13. Apparatus comprising a spring shackle bracket assembly including a pair of spaced-apart brackets, a spring eye positioned between said brackets, a bushing inside said spring eye, a pin extending between said brackets and inside of said bushing, and a combination thrust washer and seal located between each end of said spring eye and the adjacent bracket for preventing contaminants from entering into the shackle pin-bushing assembly and causing corrosion damage, each of said thrust washer and seal articles including an annular ring-shaped metal thrust washer and an annular elastomeric seal body bonded to said washer and including a layer substantially covering at least one radial face of said washer, said seal body including an anchor portion bonded to said washer and an axially extending sealing lip having a proximal end adjacent the I.D. of said washer and extending axially therefrom away from said washer and having a radially enlarged distal end with an uncompressed radial thickness greater than the radial distance between the O.D. of said pin and the I.D. of said spring eye, said distal end being press-fitted between said pin and spring eye.

14. The apparatus according to claim 13 wherein said at least one radial face is the outer radial face of said thrust washer on the opposite side thereof from said distal end of said seal portion, whereby said elastomeric layer prevents wear between said thrust washer and said bracket.

15. The apparatus according to claim 13 wherein said thrust washer comprises a flat, solid ring.

16. Apparatus comprising a spring shackle bracket assembly including a pair of spaced-apart brackets, a spring eye positioned between said brackets, a bushing inside said spring eye, a pin extending between said brackets and inside of said bushing, and a combination thrust washer and seal located between each end of said spring eye and the adjacent bracket for preventing contaminants from entering into the shackle pin-bushing assembly and causing corrosion damage each of said thrust washer and seal articles including an annular ring-shaped metal thrust washer and an annular elastomeric seal body bonded to said washer and including a layer substantially covering at least one radial face of said washer, said body including an anchor portion bonded to said washer and an axially extending sealing lip having a proximal end adjacent the I.D. of said washer and extending axially therefrom away from said washer and having a distal end located in the space between said spring eye and the O.D. of said pin and being biased radially outwardly for contacting the I.D. of said spring eye, and wherein said seal body also includes a radially extending auxiliary lip extending radially inwardly from the I.D. of said washer.

17. The apparatus according to claim 16 wherein said thrust washer comprises a flat, solid ring.

18. The apparatus according to claim 16 wherein said at least one radial face is the outer radial face of said thrust washer on the opposite side thereof from said distal end of said seal portion, whereby said elastomeric layer prevents wear between said thrust washer and said bracket.

19. An article comprising: a combination thrust washer and seal, said thrust washer being adapted to carry an axial load applied thereto by a pair of machine elements in contact with opposite radial surfaces of said thrust washer, said thrust washer having a pair of flat, continuous, smooth, radial surfaces, at least one
of which surfaces is adapted to accommodate relative rotary motion between itself and an associated machine element, said thrust washer and seal including an annular, solid, ring-shaped thrust washer and an annular seal body connected to said washer, said thrust washer including a flat, solid, rigid, metal ring and a layer of material of said seal body substantially covering at least one radial side of said ring, said seal body including an anchor portion connected to said washer and an axially extending sealing lip having a proximal end adjacent the I.D. of said washer and extending axially away from said washer and having a distal end adapted to sealingly contact at least one of an I.D. and an O.D. cylindrical surface.

20. An article comprising a combination thrust washer and seal including an annular, ring-shaped, solid, thrust washer and an annular seal body connected to said washer, said thrust washer including a flat, solid, rigid, metal ring and a layer of material of said seal body substantially covering at least one radial side of said ring, said seal body including an anchor portion connected to said washer adjacent the plane of said thrust washer and an axially extending sealing lip having a proximal end adjacent the plane of said washer and extending axially away from the plane of said washer and having a distal end adapted to sealingly contact at least one of an I.D. and an O.D. cylindrical surface.

21. The article according to claim 16 wherein said thrust washer has a pair of flat, smooth, continuous parallel, radial surfaces.

22. The article according to claim 19 wherein said ring has a thickness greater than that of said layer.

23. The article according to claim 20 wherein said ring has a thickness greater than that of said layer.

24. An apparatus comprising:
(a) a machine element having a bore extending therethrough and having a first radial surface;
(b) a second machine element associated with said first machine element and having a second radial surface adjacent and facing said first radial surface, said first and second elements being relatively rotatably movable and also being relatively axially movable such that said surfaces can be forced toward each other; and
(c) a unitary thrust washer and seal, said thrust washer and seal including a thrust washer and an annular seal body connected to said thrust washer, said thrust washer being located between and in contact with each of first and second radial surfaces and said thrust washer being adapted to carry an axial load applied thereto by said first and second machine elements, said thrust washer comprising a flat, solid, rigid metal ring and a layer of material of said seal body substantially covering at least one radial side of said ring, said thrust washer having a pair of continuous, flat, radial contact surfaces perpendicular to the axis of the thrust washer, at least one of said radial contact surfaces being adapted to accommodate relative rotary motion between itself and the respective one of said first and second surfaces in which it is in contact, and said seal body including an anchor portion connected to said washer and also including a sealing lip extending axially away from said washer.

25. The apparatus according to claim 24 including a shaft extending through said bore, and wherein said sealing lip is in sealing contact with said shaft.

26. The apparatus according to claim 25 wherein said second machine element also has a bore extending therethrough and wherein said shaft also extends through said bore of said second machine element.

27. The apparatus according to claim 26 wherein said first radial surface moves rotationally relative to said thrust washer and wherein said layer covers that one of said radial contact surfaces of said thrust washer which is in contact with said first radial surface, to reduce wear therebetween.

28. The apparatus according to claim 27 wherein said sealing lip is on the opposite side of said thrust washer from said layer.

29. The apparatus according to claim 25 wherein said seal body includes a radially extending auxiliary lip spaced apart from the distal end of said sealing lip, and extending radially inwardly from the I.D. of said washer, and wherein said auxiliary lip is also in sealing contact with said shaft.

30. The apparatus according to claim 24 wherein said washer is metal and said seal body is an elastomer bonded to said washer.

31. The apparatus according to claim 30 wherein said first radial surface moves rotationally relative to said thrust washer and wherein said layer covers that one of said radial contact surfaces of said thrust washer which is in contact with said first radial surface, to reduce wear therebetween.

32. The apparatus according to claim 22 wherein said ring has a thickness greater than that of said layer.

* * * * *